Patented July 12, 1932

1,867,049

UNITED STATES PATENT OFFICE

FRITZ BALLAUF AND ALBERT SCHMELZER, OF ELBERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ORTHO-HYDROXY-CARBOXYLIC ACIDS OF FLUORENE

No Drawing. Application filed January 17, 1930, Serial No. 421,589, and in Germany January 23, 1929.

The present invention relates to a process of preparing ortho-hydroxy-carboxylic acids of fluorene and to the new compounds obtainable thereby, more particularly it relates to compounds of the general formula:

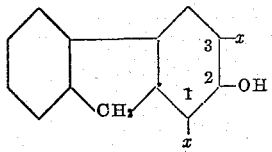

wherein one $x$ stands for hydrogen and the other $x$ stands for a carboxylic acid group.

Our new compounds are obtainable by causing carbon-dioxide to act on 2-hydroxy-fluorene at elevated temperature and superatmospheric pressure in the presence of an alkali-hydroxide, -bicarbonate or -carbonate. The temperature and the pressure used may be varied in the widest limits, temperatures between about 100–250° C. and superatmospheric pressures quite generally having been found to be suitable; preferably, the process is carried out at temperatures between about 150–200° C. and a carbon-dioxide pressure of between about 5–40 atmospheres. The quantity of the alkali to be added to the hydroxy-fluorene may range within wide limits, but in order to complete the reaction at least an equivalent quantity must be present, that is, a quantity sufficient for the formation of the alkali metal salt of the hydroxy-fluorene; thus, when working with alkali metal hydroxides and bicarbonates, molecular quantities are used, while, when working with alkali metal carbonates, half of a molecular quantity is used. During the reaction the pressure continuously decreases, and the process is complete when the pressure does not change any more, say after about 20 hours, the time required depending on the specific temperatures and pressures used.

Instead of starting with a mixture of 2-hydroxy-fluorene and an alkali metal-hydroxide, -carbonate or -bicarbonate, there may be used an alkali metal salt of 2-hydroxy-fluorene, which process is equivalent to that heretofore described.

The new fluorene-ortho-hydroxy-carboxylic acids are yellowish or greyish substances, the 2-hydroxy-fluorene-3-carboxylic acid being scarcely soluble in alcohol and having a melting point of 256–260° C., the 2-hydroxy-fluorene-1-carboxylic acid being easily soluble in alcohol and having a melting point of 235–240° C. They are valuable intermediate substances for the manufacture of dyestuffs and therapeutical agents.

The invention is illustrated by the following examples, without being limited thereto:

*Example 1.*—115 parts by weight of 2-hydroxy-fluorene are finely ground with 350 parts by weight of potassium bicarbonate and introduced into an autoclave with the addition of glass beads. Carbon-dioxide is then forced in, and the mixture is maintained at 170° C. and under 40 atmospheres pressure for some 20 hours. After cooling, the reaction product is dissolved in water, filtered and the solution is acidified. A mixture of 2-hydroxy-fluorene carboxylic acids separates as a feebly yellowish colored mass. It is filtered off by suction, washed with water and dried. The mixture contains two acids which can be separated from one another by crystallization from alcohol, namely about 60 per cent of the 2-hydroxy-fluorene-3-carboxylic acid which is soluble with difficulty in alcohol, being a yellowish substance melting at 256–260° C. with decomposition, and 40 per cent of 2-hydroxy-fluorene-1-carboxylic acid easily soluble in alcohol. It is a greyish product melting at 236–240° C. with decomposition. They give the blue iron chloride reaction typical of the ortho-hydroxy acids.

*Example 2.*—204 parts by weight of the sodium salt of 2-hydroxy-fluorene are introduced into an autoclave with the addition of glass beads. Carbon-dioxide is then forced in, and the mixture is maintained at 150° C. and 35 atmospheres for about 24 hours. After cooling, the reaction mass is worked up as described in Example 1, about 60 per cent of 2-hydroxy-3-carboxylic acid and 40 per cent of 2-hydroxy-fluorene-1-carboxylic acid being obtained.

*Example 3.*—115 parts by weight of 2-hydroxy-fluorene are finely ground with 200 parts by weight of sodium carbonate and introduced into an autoclave with the addition of glass beads. Carbon-dioxide is then forced in, and the mixture is maintained at 200° C. and under a pressure of 30 atmospheres for about 20 hours. The working up of the reaction mixture is effected as described in Example 1. Yield about 65 per cent of 2-hydroxy-fluorene-3-carboxylic acid and 35 per cent of 2-hydroxy-fluorene-1-carboxylic acid.

We claim:

1. The process which comprises causing carbon-dioxide to react upon 2-hydroxy-fluorene at a temperature between about 150–200° C. and at a pressure of 5–40 atmospheres in the presence of an alkali metal compound of the group consisting of hydroxide, carbonates and bicarbonates.

2. The process which comprises causing carbon-dioxide to react upon 2-hydroxy-fluorene at a temperature between about 150–200° C. and at a pressure of 5–40 atmospheres in the presence of an at least equivalent quantity of an alkali metal compound of the group consisting of hydroxides, carbonates and bicarbonates.

3. The process which comprises causing carbon-dioxide to react upon 2-hydroxy-fluorene at a temperature of 170° C. and at a pressure of 40 atmospheres in the presence of an at least molecular quantity of potassium bicarbonate.

4. As new products compounds of the probable general formula:

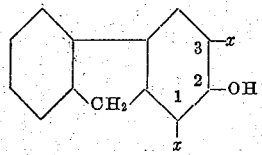

wherein one $x$ stands for hydrogen and the other $x$ stands for a carboxylic acid group, the 2-hydroxy-fluorene-3-carboxylic acid being a yellowish substance, scarcely soluble in alcohol and melting at 256–260° C., the 2-hydroxy-fluorene-1-carboxylic acid being a greyish-white colored substance, easily soluble in alcohol, melting at 236–240° C., being valuable intermediate products for the manufacture of dyestuffs and pharmaceutical agents.

In testimony whereof, we affix our signatures.

FRITZ BALLAUF.
ALBERT SCHMELZER.